United States Patent [19]
Aillet

[11] 3,781,668
[45] Dec. 25, 1973

[54] PULSE-RESPONSE MEASURING APPARATUS

[75] Inventor: Charles Aillet, Lannion, France

[73] Assignee: Societe Lannionnaise D'Electronique, Lannion, France

[22] Filed: Apr. 19, 1972

[21] Appl. No.: 245,585

[30] Foreign Application Priority Data
Apr. 19, 1971 France .................................. 7113775

[52] U.S. Cl. ............................................. 324/57 R
[51] Int. Cl. ............................................. G01r 27/00
[58] Field of Search .................................. 324/57 R

[56] References Cited
UNITED STATES PATENTS

| | | |
|---|---|---|
| 3,206,672 | 9/1965 | Gouriet et al. .................... 324/57 R |
| 3,227,949 | 1/1966 | Oberbeck ......................... 324/57 R |
| 3,479,586 | 11/1969 | Perra ................................. 324/57 R |

*Primary Examiner*—Stanley T. Krawczewicz
*Attorney*—Paul M. Craig, Jr. et al.

[57] ABSTRACT

A curve-tracing measuring apparatus which makes it possible to analyze the transmission characteristics of a four terminal network which is excited by a high frequency wave modulated by a sequence of pulses wherein fine pulse samples at the output of the four terminal network are compared with samples taken of the modulated wave at the input of the four terminal network, whereby the time which passes between the beginning of the sequence of modulated pulses and the fine sampling pulses may be adjusted at will.

12 Claims, 3 Drawing Figures

PULSE-RESPONSE MEASURING APPARATUS

The present invention relates to the field of measuring apparatus, such as curve tracers. It relates to an apparatus which makes it possible to analyze the transmission characteristics of a four terminal network which is excited by a high frequency wave which is pulse modulated. It is applicable to the measurements on a large number of transmission circuits, particularly in the field of numerical transmission by numeric phase modulation.

In the transmission over a carrier frequency by numeric phase modulation, it is important that it be possible to analyze as accurately as possible the response of the four terminal networks used in the equipment to a signal that is modulated by phase jumps. This is desirable particularly in band pass filters which are used extensively in such equipment since they have numerous functions to perform, namely the limitation of the spectrum at the emission end, the separation of the different channels at the reception end, and the elimination from the band of equivalent noise.

Such filters have a tendency to provide a distortion of the signal by producing, because of a so-called remanence phenomenon, an effect that is analogous to a cross-talking between the successive pulses due to the effect of the filtering and amplitude and to the distortion of the time of propagation of the series of pulses. In order to anticipate the probable error ratio or degree of numeric transmission contaminated by noise, it is useful to determine precisely the effect of the filtering on the signal.

Accordingly, the present invention is directed to an apparatus which makes it possible to determine both the amplitude and phase response of a four terminal network at the various instants of a pulse, or of a sequence of pulses, modulating a high frequency carrier. The apparatus comprises an instrument for the study of the response of the filters to a numeric phase modulation, but may be applied also to the study of the response of any other type of network, particularly with respect to the effect of a non-linear network (such as a limiter, a saturation amplifier, or a high level emission mixer) on the modulation by phase jumps. No apparatus presently known in the art renders it possible to analyze the impulse response of a four terminal network in amplitude and in phase.

Generally, the observation of high frequency pulses is carried out with a square wave detector and a sampling oscilloscope. However, the phase cannot be observed in this manner, the sensitivity is less than satisfactory, and the value observed is an indication of the instantaneous power output; hence, there will result a loss of information on the rising and descending fronts of the wave.

Another known system for performing such measurements is based upon a synchronous detection which provides an improved sensitivity, but does not directly produce an indication of the phase and the amplitude.

Another known method is the heterodyne method which utilizes a sampling oscilloscope to determine the phase relationship between the carrier received and the modulation frequency. However, this method does not provide for automatically posting the amplitude and the phase of the high frequency wave.

The apparatus as proposed by the present invention utilizes a simultaneous sampling of a high frequency carrier wave with very fine pulses, the high frequency carrier wave being modulated by the pulses so that the time which elapses between the beginning of the pulse and the sampling instant varies linearly during one repetitive modulation sequence. The fine pulses have a substantially shorter duration than the period of the high frequency carrier wave, for example by a factor of 10. With appropriate means, a correlation is established between the succession of sequences and the fine pulses in a manner such that one fine pulse is provided per sequence and the sampling instant varies regularly in the sequence.

These and other features of the present invention will become more apparent from the following detailed description, when taken with the accompanying drawings which illustrate one exemplary embodiment of the present invention, and wherein.

Figure 1:
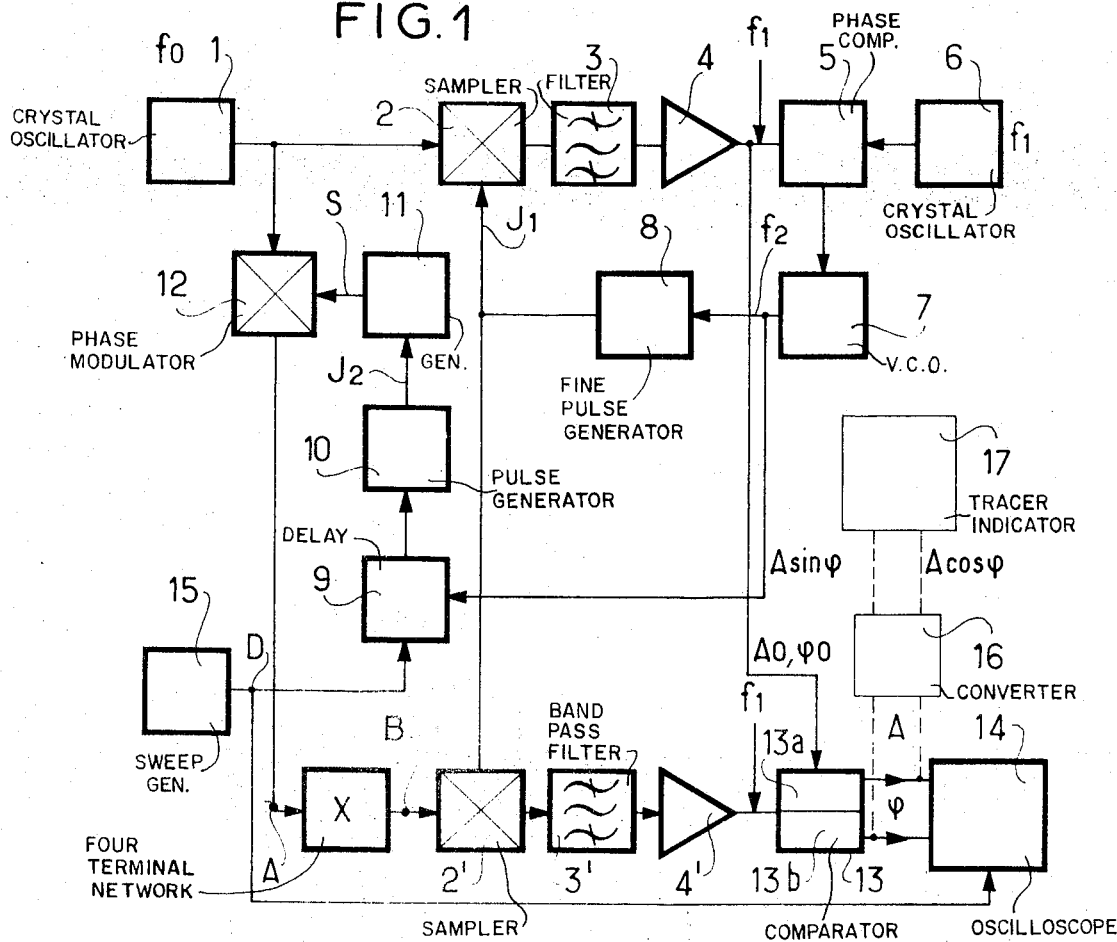
FIG. 1 is a schematic block diagram of one embodiment of the present invention.

The apparatus shown in FIG. 1 includes a stable oscillator 1, such as a crystal oscillator, providing a carrier frequency fo to one input of a sampler 2 formed similar to a modulator and receiving on a second input thereof a series of fine sampling pulses provided at the output of a pulse generator 8.

The output of the sampler 2 is applied through a band pass filter 3 which passes a reference frequency f1 to the input of an amplifier 4 whose output is connected to one input of a phase comparator 5. The phase comparator 5 receives at the other input thereof a reference frequency f1 provided by a stable oscillator 6, which also may be a crystal oscillator.

The phase comparator 5, for example, may be either of the analog type using multiplication, or the logic type evaluating the spacing between rectangular pulses. In the first case, a differential detection system is energized on the one hand by the sum of the two waveforms and on the other hand by the difference therebetween. With this arrangement, the output is obtained as a direct current voltage which is proportional to the cosine of the phase shift between the two waves. In the second case, the two waves are transformed into a succession of rectangular pulses. With this arrangement the output obtained is a voltage which is proportional to the phase shift.

The output of the phase comparator 5 is connected to the control input of a voltage controlled oscillator 7 having an output forming a scanning frequency $f2$ which is applied to the input of the fine pulse generator 8 providing pulses J1 having a width $d1$ and a frequency $f2$ synchronized to the frequency $f2$ at the output of the oscillator 7.

The output of oscillator 7 is also connected to the input of a delay member 9 which is electronically controlled thereby to synchronize the pulse output of a generator 10 to the frequency $f2$. The pulse generator 10 provides a train of pulses J2 having a width $d2$, which pulses are applied to a generator 10 which generates a sequence S modulated particularly by phase jump and synchronized to the output pulses of the generator 10.

A phase modulator 12 receives the signal fo from the oscillator 1 at one input thereof and the modulation signals S from the generator 11 at a second input thereof. The width d2 of the pulses generated by the generator 10 is equal to the duration of one sequence S provided by the generator 11. Outside of the sequence S the frequency level fo issuing from the modulator 12 is zero. The output of the phase modulator 12 is applied to an input of a test four terminal network X, for example a band pass filter, whose output B is connected to the input of a modulator 2' which comprises a sampler similar to the sampler 2 connected to the output of the oscillator 1. A band pass filter 3' which is identical to the filter 3 is connected to the output of the sampler 2' and an amplifier 4' similar to the amplifier 4 is connected to the output of the filter 3'.

The output of the amplifier 4' is connected to a comparator 13 comprising a first part 13a formed by an amplitude comparator and a second part 13b formed by a phase comparator. The comparator 13 receives the output of the amplifier 4' which is the frequency $f1$ extracted from the output voltage of the four terminal network X, and the output of the amplifier 4, both parts of the comparator operating on the respective amplitude and phase portions of these signals. An oscilloscope is connected to the output of the comparator 13 to provide a visual indication of the outputs of the amplitude comparator 13a and phase comparator 13b, respectively. This oscilloscope 14 may be of the type which receives the respective signals alternately to provide a simultaneous indication of both signals, or it may be of the type having two beams which are individually controlled by the respective signals. The scanning of the oscilloscope 14 is controlled by the output of a sweep generator 15, the output of which is also applied in control of the delay device 9.

The respective phase and amplitude outputs of the comparator 13 are also applied through an operating device 16 to an element which is capable of tracing the signals in polar coordinates, such as the conventional device for producing a Smith diagram.

The sampler 2', filter 3' and amplifier 4' preferably have the same structure as the corresponding elements 2, 3 and 4, respectively. The modulator 2' is energized by the output signal of the pulse generator 8 as well as the output of the test four terminal network.

It is assumed, by way of example, that $fo = 500$ MHz and $f1 = 100$ kHz. It is further assumed that the harmonic $k = 250$ of $f2$ is greater by $f1$ ($= 100$ kHz) than fo ($= 500$ MHz). This results in $$250\ f2 = fo + f1 = 500.1\ \text{MHz}\ f2 = 2.0004\ \text{MHz}$$

while fo is susceptible to varying, for example between 500 and 600 MHz. When fo varies, the values of $k$ and of $f2$ do not remain fixed; they will become regulated on their own in a manner such that the control system furnishes a frequency beat of $f1 = 100$ k H2.

It is also assumed that the fine pulses, for example, have a width d1 equal to 1/10 of the period of fo, or $d1 = 0.2$ ns.

The width d2 as the duration of one sequence S is not critical; it may be equal to about a hundred nanoseconds, for example, in the present case. In the particularly important case of the study of a numerical transmission path, d2 is a multiple of the duration of the unit bit.

The sequence furnished by the sequence generator 11 is left to the choice of the operator. Advantageously, one of the following sequences will be employed:

a. single pulse;
 b. two phase pulses 0° and 180°;
 c. two phase pulses 0° and 90°.

The variable delay $\tau$ may vary at the maximum between a reference value $\tau$ o (which may be zero) and a value $\tau o + \Delta\tau$, covering the interval which separates two beginnings of successive sequences. Possibly, a lower value may be given thereto.

Figure 2:
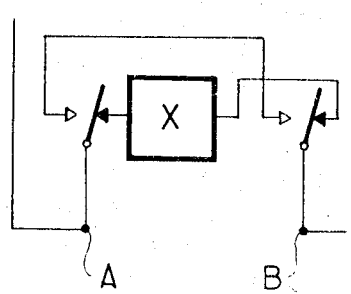
FIG. 2 is a partial schematic view of a modification of FIG. 1.

In order to allow for a calibration of the apparatus, a bipolar inverter may be inserted between points A and B, as seen in FIG. 2. In the position seen in FIG. 2, the test four terminal network is in circuit; in the other position it is replaced by a short-circuit.

Figure 3:
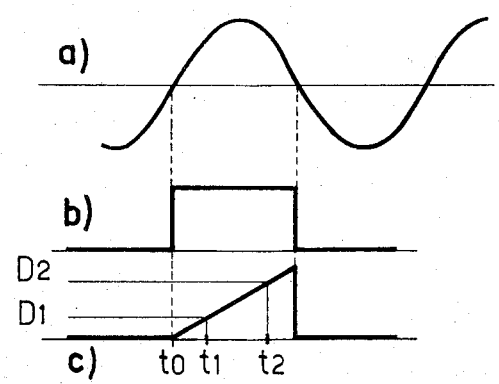
FIG. 3 is a waveform diagram providing a series of waveforms which aid in explaining the operation of a portion of the system shown in FIG. 1.

FIG. 3 illustrates three waveforms so as to facilitate the understanding of the operation of variable delay member 9, taken by way of example.

Waveform (a) shows the output voltage of the oscillator 7, which is assumed to be sinusoidal. From this sinusoidal wave is derived a square wave (b) with known means. From this square wave (b) is derived a "ramp" voltage (c) by means of an equally known integrator. A voltage having the value D1 and originating from the generator 15 (see FIG. 1) produces cutting off of the generator 11 at the instant $t1$ with respect to a time $to$, which is taken as the origin; whereas, a higher voltage value D2 will produce a cutting off at a time $t2$, which is subsequent to $t1$. The instants $t1$ and $t2$, etc., are those times during which the "ramp" voltage (c) is equal to the instantaneous value of the voltage D1 or D2, etc.

The comparator 5 controls the frequency of the oscillator 7 to a value such that the frequency ($f1$) received by the input of the comparator 5 connected to the output of amplifier 4 is equal to the frequency $f1$ received by the input connected to the crystal oscillator 6.

The residual phase shift between the two waves furnishes the error signal which serves to provide the automatic control. The oscillator 7 having a frequency $f2$ serves to synchronize the fine pulses J1 furnished by the generator 8. These pulses have a duration $d1$ which is a fraction of the period of the wave having the frequency fo furnished by the stable generator fo. For example, for a frequency $fo = 500$ MHz, with $1/fo = 2$ns, one will find $d1 = 0.2$ns.

The frequency $f2$ also serves to synchronize the generator 10 of pulses J2 which serve themselves for synchronizing the generator 11 of sequences S. The sequences of pulses S synchronized by the pulses J2 serve to modulate the phase of the carrier fo generated by the generator 1 by means of the modulator 12.

The carrier fo modulated by the sequences S is applied to the input of the test four terminal network X. The wave issuing from the network X undergoes sampling in the sampler 2' under control of the same pulses J1 which proceed with the sampling of the non-modulated carrier in the sampler 2. There issues from the amplifier 4' a wave having a frequency ($f1$), the same frequency as the wave issuing from the amplifier 4, but with a different phase and amplitude.

The comparator 13 comprises two parts, both of a known type: an amplitude comparator 13a and a phase comparator 13b. These two portions furnish an amplitude signal (A) with respect to the amplitude Ao of the reference wave taken as unit of measurement and a phase signal ($\phi$) with respect to the phase $\phi°$ of the reference wave taken as the origin. These signals may be applied alternately with vertical spacing to an oscilloscope 14 which receives a horizontal sweep control from the sawtooth voltage D furnished by the generator 15.

Another means for data presentation of the measuring results may be furnished by a member 16 of known type which produces from the input quantities A and $\phi$ the quantities A cos $\phi$ and A sin $\phi$, which are applied to an indicating apparatus 17 in the from of a tracer in polar coordinates (Smith diagram).

It is thus obvious that the apparatus, by causing the beginning of the sequence (pulse J2) to vary with respect to the instant of sampling (pulse J1), makes it possible to finely analyze the amplitude and phase variations in the course of the pulses of one sequence, particularly during the transitory periods. Since the pulses of the beginning of a sequence J2 are synchronized with respect to the sampling pulses J1, one obtains one sampling pulse J1 per sequence. Possibly it may be possible to select as the parameters values furnishing one sampling pulse for m sequences, m being an integer. The variable delay produced by the member 9 results in a progressive displacement of the sampling pulse all along the sequence, which furnishes, at the output of the comparator 13, a very fine analysis of the amplitude and phase variations at the output of the network X.

The problem of the delay causes variation in the instant of the samplings with respect to the beginning of the sequence. One could have proceeded differently by leaving the beginning of the sequence fixed and by causing the instant of the samplings to vary instead; however, the solution described above is more advantageous in that it is technologically more simple and also surer to leave the reference fixed.

The numerical values indicated hereinabove have been given solely by way of example.

What is claimed is:

1. An apparatus for measuring the pulse response of a four terminal network having an input and an output comprising a carrier frequency generator having an output, first means for producing a sequence of first pulses, second means having an output and being connected to said carrier frequency generator and said first means for modulating said carrier frequency by said sequence of first pulses, the output of said second means being connected to the input of said four terminal network, third means for generating narrow pulses having a shorter duration than the period of said carrier wave, fourth means connected to said first and said third means for varying the interval between one of said first pulses and one of said narrow pulses, first sampling means having an output and being responsive to said third means for sampling the output of said carrier frequency generator, second sampling means having an output and being responsive to said third means for sampling the output of said four therminal network, and comparator means for comparing the amplitude and phase of the outputs of said first and second sampling means.

2. An apparatus according to claim 1 wherein said comparator means includes an amplitude comparator and a phase comparator each connected to receive the outputs of said first and second sampling means.

3. An apparatus according to claim 2 wherein said comparator means is connected to an oscilloscope.

4. An apparatus according to claim 1 wherein said third means includes a pulse generator providing said narrow pulses, a voltage controlled oscillator connected to the input of said pulse generator in synchronizing control thereof, a reference frequency generator, a band pass filter connected to the output of said first sampling means, and a phase comparator having inputs connected to said band pass filter and said reference frequency generator and an output connected in control of said voltage controlled oscillator.

5. An apparatus according to claim 4 wherein said first and second means include means for generating pulses with modulation by phase shift keying.

6. An apparatus according to claim 4 wherein said fourth means includes a variable delay device connected between the output of said voltage controlled oscillator and said first means.

7. An apparatus according to claim 6 wherein said comparator means is connected to an oscilloscope, and further including a sweep generator connected to said delay device and said oscilloscope.

8. An apparatus according to claim 6 wherein a second band pass filter is connected between said second sampling means and said comparator means.

9. An apparatus according to claim 4 including switching means for selectively replacing said four terminal network with a short circuit element to effect calibration of the apparatus.

10. An apparatus according to claim 4 wherein curve tracing means for providing a polar diagram is connected to the output of said comparator means.

11. An apparatus according to claim 10 wherein said comparator means includes an amplitude comparator and a phase comparator each connected to receive the outputs of said first and second sampling means.

12. An apparatus according to claim 11 wherein said fourth means includes a variable delay device connected between the output of said voltage controlled oscillator and said first means.

* * * * *